United States Patent [19]

Nakano et al.

[11] Patent Number: 4,703,020
[45] Date of Patent: Oct. 27, 1987

[54] PROCESS FOR THE PRODUCTION OF JEWELLING AND ORNAMENTAL MATERIAL

[75] Inventors: Yuji Nakano, Kameoka; Kazushi Kamiyama; Tatuo Kobayashi, both of Kyoto, all of Japan

[73] Assignee: Kyocera Corporation, Kyoto, Japan

[21] Appl. No.: 824,093

[22] Filed: Mar. 26, 1986

Related U.S. Application Data

[62] Division of Ser. No. 664,710, Oct. 25, 1984, Pat. No. 4,608,307.

[30] Foreign Application Priority Data

Oct. 26, 1983 [JP] Japan ................................. 58-201345

[51] Int. Cl.$^4$ .............................................. C30B 28/00
[52] U.S. Cl. ........................................ 501/86; 501/12; 501/102; 501/133; 63/32
[58] Field of Search ..................... 63/32; 428/402, 404; 501/102, 86, 133, 12

[56] References Cited

U.S. PATENT DOCUMENTS 3,497,367  2/1970  Gaskin et al. ................. 501/86 OR
4,090,887  5/1978  Marquisee et al. ............ 423/338 X
4,581,292  4/1986  Shinpo et al. ................... 428/404 X Primary Examiner—Mark L. Bell
Assistant Examiner—Karl Group
Attorney, Agent, or Firm—Spensley Horn Jubas & Lubitz

[57] ABSTRACT

A jewelling and ornamental material comprising many amorphous silica spheres regularly arranged in a three-dimensional array and a zirconium compound filled in pores existing among the amorphous silica spheres, the amount of the zirconium compound being 0.005 to 8% by weight, as zirconium, based on the entire material; and a process for its production. This material has a play of colors inherent to natural opal, and excellent durability.

29 Claims, No Drawings

PROCESS FOR THE PRODUCTION OF JEWELLING AND ORNAMENTAL MATERIAL

This is a division of application Ser. No. 664,710, filed on Oct. 25, 1984, now U.S. Pat. No. 4,608,307.

BACKGROUND OF THE INVENTION

1. Field of the Invention:

This invention relates to a jewelling and ornamental material and a process for production thereof, and more specifically, to a jewelling and ornamental material which produces the play of colors of natural opal and to a process for production thereof.

2. Description of the Prior Art

Natural opal has a structure in which many amorphous silica spheres are regularly aligned in a three-dimensional array. Light incident upon it makes Bragg reflection in a unique play of colors owing to these amorphous silica spheres and pores formed by these spheres. Hence, opal is valued as a jewelling and ornamental material such as a ring, pendant or part of ornamental plate.

However, natural opal has very low mechanical strength because the many amorphous silica spheres are bonded through point-to-point contact. Thus, it has the defect that upon application of heat, the gas within the pores is expanded to break it or develop many fine cracks within the structure whereby it becomes whitely hazy and the play of colors is impaired.

As a material having an equivalent play of colors to natural opal but improved mechanical strength, there has been proposed a jewelling and ornamental material composed of many amorphous silica spheres three-dimensionally arranged regularly in which a resin binder such as an acrylic resin or a styrene resin is impregnated and cured within the pores formed by the above arrangement.

Since the acrylic resin or styrene resin as a binder has poor weatherability, heat resistance and chemical resistance, it develops a yellowish color with the passage of time to reduce the play of colors of the jewelling and ornamental material and degrade its merchandize value. Another defect of this prior jewelling and ornamental material is that the binder dissolves owing to the application of heat or the adhesion of a solvent such as alcohols and benzene and causes distortion or breakage of the jewelling and ornamental material.

SUMMARY OF THE INVENTION

We have made various investigations in view of such defects, and have found that by arranging many amorphous silica spheres regularly in a three-dimensional array and filling a suitable amount of zirconium in the pores formed by this arrangement, there can be obtained a jewelling and ornamental material which exhibits a play of colors similar to that of natural opal to such a degree as to make it difficult to draw a distinction between them, and has markedly improved weatherability, heat resistance and chemical resistance.

The present invention is based on the above discovery and has for its object the provision of a jewelling and ornamental material having a play of colors very similar to natural opal and excellent weatherability, heat resistance and chemical resistance.

According to this invention, there is provided a jewelling and ornamental material comprising many amorphous silica spheres regularly arranged in a threedimensional array and a zirconium compound filled in pores existing among the amorphous silica spheres, the amount of the zirconium compound being 0.005 to 8% by weight, as zirconium, based on the entire material.

According to this invention, there is also provided a process for producing a jewelling and ornamental material, which comprises a step of producing a structure composed of regularly three-dimensionally arranged amorphous silica spheres by subjecting a mixture of uniform amorphous silica spheres having a predetermined diameter and water to a sedimentation operation and then to drying and calcining operations, a step of impregnating the three-dimensionally arranged structure with a solution of a zirconium alkoxide so that the amount of zirconium based on the entire structure becomes 0.005 to 8% by weight, hydrolyzing the zirconium alkoxide to zirconium oxide or hydroxide and precipitating it in the pores of the structure, and a step of calcining the resulting structure at a high temperature.

DETAILED DESCRIPTION OF THE PREFERRED EMBODIMENTS

The main raw material of the jewelling and ornamental material of this invention is amorphous silica spheres. The zirconium compound such as zirconium oxide to be filled among the amorphous silica spheres is a binder component which imparts a play of colors equivalent to that of natural opal to the jewelling and ornamental material, binds the amorhous silica spheres to one another, and further imparts mechanical strength, weatherability, etc. to the material.

The zirconium compound to be filled among the amorphous silica spheres is present in the form of an oxide of zirconium such as zirconium dioxide ($ZrO_2$). The oxide of zirconium may also be present in the form of a mixture with carbon or another oxide such as silica, titania, calcia, magnesia, alumina, iron oxide, cobalt oxide, chromium oxide and manganese oxide, or in the form of a salt such as zirconium silicate, or in the form of another compound such as zirconium carbide.

In order to impart the play of colors which natural opal has and to improve weatherability, heat resistance and chemical resistance, it is important in the jewelling and ornamental material of this invention to arrange many amorphous silica spheres three-dimensionally and to fill a zirconium compound in an amount of 0.005 to 8% by weight as zirconium based on the entire material in pores formed among the amorphous silica spheres by the above arrangement.

If the amount of zirconium as the binder component is less than 0.005% by weight, the jewelling and ornamental material becomes transparent and does not produce a play of colors and is inferior in its physical properties such as mechanical strength and weatherability. On the other hand, when the zirconium content exceeds 8% by weight, the jewelling and ornamental material obtained is whitely hazy and completely loses its play of colors so that its merchandise value is drastically reduced. To obtain the desired play of colors and the desired physical properties such as mechanical strength and weatherability, the amount of the binder component should be limited to the above-specified suitable range.

The regular three-dimensional arrangement of amorphous silica spheres in this invention denotes the arrangement of the silica spheres in a primitive cubic structure, a face-centered cubic structure, a hexagonal close-packed structure, a body-centered cubic structure or a composite structure where the aforesaid structures are partly co-existent. To arrange the silica spheres regularly three-dimensionally, the variation of the diameter of the silica spheres is adjusted to a value within ±15%, desirably within ±4%.

To develop a play of colors, there is a limitation on the diameter of the amorphous silica spheres. It is important that their particle diameter should generally be in the range of 150 to 400 mμ, particularly 200 to 350 mμ. If the particle diameter of the silica spheres falls outside the above specified range, it is difficult to obtain a play of colors similar to that of natural opal.

When the zirconium compound is filled in an amount of 0.005 to 8% by weight as zirconium (Zr) in the pores among the three-dimensionally arranged amorphous silica spheres, the resulting jewelling and ornamental material has high mechanical strength, is completely free from changes with time such as yellowing and from deformation and breakage attributed to the application of heat or the adhesion of solvent, and has a play of colors very similar to that of natural opal. Accordingly, the jewelling and ornamental material of this invention has a very high market value.

To produce the jewelling and ornamental material of this invention, a mixture of amorphous silica spheres and water is subjected to a sedimentation operation and then to drying and calcining operations to form a structure composed of regularly three-dimensionally arranged amorphous silica spheres. The amorphous silica spheres having a particle diameter in the above-specified range are produced by methods known per se. For example, they can be obtained by agitating a pure silica sol, obtained from an aqueous solution of sodium silicate by ion-exchange treatment, under heat over several weeks, and separating the resulting precipitate of silica spheres by centrifugal separation. Alternatively, amorphous silica spheres having a suitable particle diameter can be obtained by hydrolyzing an emulsion of tetraethyl silicate at a controlled rate. The mixture of amorphous silica spheres and water is left to stand gently for several weeks to several months to subject it to spontaneous sedimentation. The resulting jelly-like precipitate is spontaneously dried, and then calcined to a temperature of 700° to 900° C. to form a three-dimensionally arranged structure.

A zirconium alkoxide in the form of a solution is impregnated in the three-dimensional structure. The zirconium alkoxide may be represented by the following formula Zr(OR)$_4$ wherein R is an alkyl group having 1 to 4 carbon atoms.

Particularly, zirconium ethoxide, isopropoxide, n-propoxide and butoxide are used in this invention. These alkoxides are soluble in the corresponding alcohols and used as alcohol solutions for the impregnating operation. The suitable concentration of the zirconium alkoxide in the solution, which may differ depending upon the pore content of the structure, is 5 to 60% by weight. If an alkoxide or another metal or element is included in this solution, zirconium oxide precipitates as a composite with an oxide of the other element. The impregnated solution is contacted with water to precipitate the zirconium alkoxide in the form of an oxide or hydroxide within the pores of the structure. Room temperature suffices as a temperature condition during hydrolysis, but some extent of heating or cooling may be carried out.

The resulting structure in which the zirconium compound is precipitated in the pores is then calcined to obtain a final product. Calcination may suitably be carried out at a temperature of 1,000° to 1,300° C. for a period of 20 to 36 hours.

The marked advantages of this invention will be readily seen from the following examples.

EXAMPLE 1

Amorphous silica spheres having a particle diameter of about 300 mμ (20% by volume) were mixed with stirring with 80% by volume of water. The mixture was then left to stand to sediment the silica spheres spontaneously and thus form a jelly-like mass in which the silica spheres were regularly arranged.

The jelly-like mass was spontaneously dried in air, and calcined at a temperature of about 800° C. to obtain a three-dimensionally arranged structure of silica spheres.

The resulting three-dimensional structure was immersed in a solution of zirconium n-propoxide in n-propyl alcohol having a zirconium concentration of 10% to impregnate zirconium n-propoxide in the pores within the structure. At the same time, zirconium oxide was precipitated from zirconium n-propoxide by hydrolysis. The entire structure was then calcined at a temperature of about 1150° C. for about 30 hours to obtain a jewelling and ornamental material.

Colorimetric analysis showed that the resulting jewelling and ornamental material contained 1.3% by weight of zirconium. This material had a play of colors equivalent to that of natural opal. Even when the material was heated to 200° C. or a solvent such as an alcohol was adhered to it, its play of colors did not vanish, nor was it distorted or broken. It was therefore found to have a very high market value as a jewelling and ornamental material.

EXAMPLE 2

A jewelling and ornamental material was obtained by the same method as in Example 1 except that the concentration of zirconium in the solution in Example 1 (10%) was changed to 40%.

Colorimetric analysis showed that the resulting jewelling and ornamental material contained 5.5% by weight of zirconium. Although this material was whitely hazy on the whole to a slight extent, it exhibited a play of colors equivalent to that of natural opal. Even when it was heated to 200° C. or a chemical such as an alcohol was adhered, its play of colors did not vanish nor was it distorted or broken. Thus, it was found to have a high market value as in the case of the material obtained in Example 1.

COMPARATIVE EXAMPLE 1

A jewelling and ornamental material was obtained by the same method as in Example 1 except that the concentration of zirconium in the solution in Example 1 (10%) was changed to 1%.

Colorimetric analysis showed that the resulting jewelling and ornamental material contained 0.002% of zirconium. This material was transparent wholly, and produced only a very weak play of colors. When it was heated to 200° C., it was broken and had no merchandize value as a jewelling and ornamental material.

COMPARATIVE EXAMPLE 2

A jewelling and ornamental material was obtained by the same method as in Example 1 except that the concentration of zirconium in the solution in Example 1 (10%) was changed to 70%.

Colorimetric analysis showed that the resulting material contained 9.00% by weight of zirconium. It was whitely hazy on the whole, had no play of colors and therefore lacked a merchandize value as a jewelling and ornamental material.

As can be easily seen from a comparison between the foregoing Examples and Comparative Examples, the present invention can provide a jewelling and ornamental material which exhibits a play of colors equivalent to that of opal, possesses excellent physical properties such as weatherability, heat resistance and chemical resistance, and has a very high market value by regularly arranging many amorphous silica spheres three-dimensionally and filling a suitable amount of a zirconium compound in the pores formed among the silica spheres by the above arrangement.

It should be understood that the jewelling and ornamental material of this invention is not limited to the above Examples alone, and various changes, substitutions and additions are possible within the scope of the appended claims.

What is claimed is:

1. A process for producing a jewelling and ornamental material, which comprises:
    producing a structure composed of regularly three-dimensionally arranged amorphous silica spheres by subjecting a mixture of uniform amorphous silica spheres having a particle diameter within the range of from about 0.15 $\mu$m to about 0.4 $\mu$m, with water to a sedimentation operation and then to drying and calcining operations, said calcining operation occurring at a temperature within the range of from 700° to 900° C.,
    impregnating the three-dimensionally arranged structure with a solution of a zirconium alkoxide so that the amount of zirconium based on the entire structure becomes 0.005 to 8% by weight, hydrolyzing the zirconium alkoxide to zirconium ozide or hydroxide and precipitating it in the pores of the structure, and
    calcining the resulting structure at a temperature of from 1,000° to 1,300° C.

2. A process according to claim 1 wherein the particle diameter ranges from 0.2 $\mu$m to 0.35 $\mu$m.

3. A process according to claim 1 wherein the zirconium alkoxide is selected from the group consisting of zirconium n-propoxide, zirconium butoxide, zirconium ethoxide, zirconium isopropoxide and mixtures thereof.

4. A process according to claim 1 wherein the calcining operation is performed over a time period ranging from 20 to 36 hours.

5. A process according to claim 1 wherein the three-dimensionally arranged structure of silica spheres comprises a cubic structure.

6. A process according to claim 1 wherein the three-dimensionally arranged structure of silica spheres comprises a face-centered structure.

7. A process according to claim 1 wherein the three-dimensionally arranged structure of silica spheres comprises a hexagonal close-packed structure.

8. A process according to claim 1 wherein the three-dimensionally arranged structure of silica spheres comprises a body-centered cubic structure.

9. A process according to claim 1 wherein the three-dimensionally arranged structure of silica spheres comprises a combination of a cubic structure, a face-centered structure, a hexagonal close-packed structure and a body-centered cubic structure.

10. A process for producing synthetic opal comprising the following steps:
    forming a three-dimensionally arranged mass of silica spheres having a particle diameter ranging from 0.15 $\mu$m to 0.4 $\mu$m; and
    impregnating a zirconium compound within the pores between the particles in the mass, wherein the impregnated zirconium is 0.005 to 8% by weight of the entire structure, and calcining the structure.

11. A process according to claim 10 wherein the forming step comprises mixing amorphous silica spheres having a particle diameter ranging from 0.15 $\mu$m to 0.4 $\mu$m with a liquid thereby to form a silica sphere liquid mixture;
    sedimenting a jelly-like mass of silica spheres from the mixture, the mass comprising regularly arranged silica spheres; and
    calcining the jelly-like mass at a temperature ranging from 700° to 900° C. thereby to form a three-dimensionally arranged structure of silica spheres.

12. A process according to claim 11 wherein the particle diameter of the amorphous silica spheres ranges from 0.2 $\mu$m to 0.35 $\mu$m.

13. A process according to claim 11 wherein the calcining operation is performed at a temperature of 800° C.

14. A process according to claim 11 wherein the three-dimensionally arranged structure of silica spheres comprises a primitive cubic structure.

15. A process according to claim 11 wherein the three-dimensionally arranged structure of silica spheres comprises a face-centered structure.

16. A process according to claim 1 wherein the three-dimensionally arranged structure of silica spheres comprises a hexagonal close-packed structure.

17. A process according to claim 11 wherein the three-dimensionally arranged structure of silica spheres comprises a body-centered cubic structure.

18. A process according to claim 11 wherein the three-dimensionally arranged structure of silica spheres comprises a combination of a primitive cubic structure, a face-centered structure, a hexagonal close-packed structure and a body-centered cubic structure.

19. A process according to claim 10 wherein the impregnating step comprises:
    emersing the three-dimensionally arranged mass of silica spheres in a solution of a zirconium compound thereby to impregnate a zirconium compound within pores within the three-dimensionally arranged structure of silica spheres; and
    calcining the structure resulting from the previous step at a temperature ranging from 1,000° to 1,300° C. for a time period ranging from 20 to 36 hours.

20. A process according to claim 19 wherein the solution is an alcohol solution.

21. A process according to claim 19 wherein the zirconium compound is present in the solution from 5 to 60% by weight.

22. A process according to claim 21 wherein the zirconium compound is present at 40% by weight.

23. A process according to claim 19 wherein the first mentioned zirconium compound comprises $Zr(OR)_4$, wherein R is an alkyl group having 1 to 4 carbon atoms.

24. A process according to claim 23 wherein the zirconium compound is zirconium n-propoxide.

25. A process according to claim 23 wherein the zirconium compound is zirconium butoxide.

26. A process according to claim 23 wherein the zirconium compound is zirconium ethoxide.

27. A process according to claim 23 wherein the zirconium compound is zirconium isopropoxide.

28. A process according to claim 19 wherein the calcining step is performed at a temperature of 1,150° C.

29. A process according to claim 19 wherein the calcining step is performed for 30 hours.

* * * * *